United States Patent [19]

Harte et al.

[11] Patent Number: 4,789,475
[45] Date of Patent: Dec. 6, 1988

[54] WATER PURIFICATION MATERIAL, PROCESS THEREFOR, AND DEVICE FOR THE REMOVAL OF HEAVY METAL TOXINS

[75] Inventors: Richard A. Harte, Redwood City; David B. Wilson, Sunnyvale, both of Calif.

[73] Assignee: Environmental Concerns, Inc., Belmont, Calif.

[21] Appl. No.: 65,829

[22] Filed: Jun. 23, 1987

[51] Int. Cl.[4] .................... B01D 23/14; B01J 20/32
[52] U.S. Cl. ............................ 210/502.1; 210/504; 210/688; 210/912; 502/417; 502/516
[58] Field of Search ............ 210/282, 287, 460, 502.1, 210/504, 688, 694, 698, 701, 733, 911–914; 502/416, 417, 439, 516

[56] References Cited

U.S. PATENT DOCUMENTS

| | | | |
|---|---|---|---|
| 2,773,601 | 12/1956 | Keller et al. | 210/287 X |
| 3,118,831 | 1/1964 | Morris | 210/688 |
| 3,873,581 | 3/1975 | Fitzpatrick et al. | 210/688 X |
| 4,080,171 | 3/1978 | Sano et al. | 210/679 X |
| 4,157,434 | 6/1979 | Floryan et al. | 210/502.1 X |
| 4,220,726 | 9/1980 | Warshawsky | 210/679 X |
| 4,303,704 | 12/1981 | Courduvelis et al. | 210/912 X |
| 4,430,226 | 2/1984 | Hegde et al. | 210/287 X |
| 4,496,664 | 1/1985 | Motojima | 210/688 X |
| 4,500,494 | 2/1985 | Scher | 210/679 X |
| 4,566,972 | 1/1986 | Bennison et al. | 210/698 |
| 4,578,195 | 3/1986 | Moore et al. | 210/912 X |
| 4,659,512 | 4/1987 | Macedo et al. | 210/688 X |

FOREIGN PATENT DOCUMENTS

| | | | |
|---|---|---|---|
| 23863 | 2/1977 | Japan | 210/912 |
| 150434 | 9/1983 | Japan | 210/688 |
| 216775 | 12/1983 | Japan | 210/688 |
| 106585 | 6/1985 | Japan | 210/688 |
| 161191 | 7/1986 | Japan | 210/688 |
| 929590 | 5/1982 | U.S.S.R. | 210/688 |

*Primary Examiner*—Robert Spitzer
*Attorney, Agent, or Firm*—Robert O. Guillot

[57] ABSTRACT

A filter bed material for the removal of heavy metal ions from water and process for the manufacture thereof. The bed material includes a charcoal bed having a chelating agent adsorbed thereto utilizing a polymer to aid in the adsorption of the chelating compound.

10 Claims, 1 Drawing Sheet

WATER PURIFICATION MATERIAL, PROCESS THEREFOR, AND DEVICE FOR THE REMOVAL OF HEAVY METAL TOXINS

BACKGROUND OF THE INVENTION

1. Field of the Invention

The present invention relates to devices, materials and processes for the purification of water, and more particularly to a material and process for making the material and to a device for removing heavy metals from water utilizing chelating agents bound to filter bed materials.

2. Description of the Prior Art

Increased attention is being paid to the quality of our drinking water. Studies continue to reveal frightening facts about the decline of water quality, the increase of water-borne diseases, the exponential increase in the amount of toxic chemicals in our water tables and an ever-growing awareness that the chemicals employed in water treatment such as Chlorine and Alum under certain conditions can do more harm than good.

Communities are, at last, addressing the task of keeping our common water supply safe through the construction of sewage treatment facilities, water purification plants, the levying of heavier fines against toxic waste dumpers, etc., but these require years of legislative action and major engineering construction programs. However, of the three types of contaminants—bacterial and viral, toxic chemical, and heavy toxic metals—only the first two are addressed in present home purification methods employing filtration.

There is a need to remove toxic heavy metals from our drinking water because of the severe nature of the health hazards. Of particular concern is lead salts, which can leach from the pipes and solder joints of our home plumbing. Therefore, even though the municipal water supply may be free of these toxic materials, we may still be at risk in our homes.

Generally, three approaches can be taken by people at home. They can trust their water supply, purchase water from outside vendors, and purify their tap water at home. More and more people are leaving the first option and choosing one of the others.

With regard to home water purification, there are three systems currently available:

(1) Carbon Filters; these are designed to remove organics like chlorinated hydrocarbons, pesticides, etc., and sediment if they contain cellulosic or paper prefilters. They make water look, smell and taste better, but do not remove significant amounts of bacteria or hazardous toxic metals. U.S. Pat. Nos. 4,107,047, Turetsky, Aug. 15, 1978; 4,107,046, Corder, Aug. 15, 1978; and 3,561,602, Moltor, Feb. 9, 1971, are illustrative of the use of carbon filters and impregnated carbon filters of the prior art.

(2) Reverse Osmosis Filtration; this process removes most larger molecules and takes care of from less than 50% to more than 99% of contaminants, depending upon the particular system. However, R.O. Filters are generally expensive and can break down when saturated with pollutants.

(3) Distillers; steam distillation is a very effective method for reducing nearly all contamination but it is an expensive unit, requires considerable power with resulting operational costs involved, and can produce limited amounts of water per day.

Two further methods exist for purifying water that have not become generally available for drinking water purification. These methods are the use of ion exchange resins (also known as water softeners) and the use of chelating agents. The use of ion exchange resins in water purification has been described in such U.S. Pat. Nos. as 4,182,676, Casolo, Jan. 8, 1980, and 4,100,065, Etzel, July 11, 1978. In utilizing ion exchange resins, heavy metal ions are removed from the water by replacing such ions with lighter-weight ions such as sodium or potassium.

The use of chelating agents for removal of heavy metal ions from water is described in U.S. Pat. No. 4,500,494, Sher, Feb. 19, 1985 in which chelating agents are encapsulated in microcapsules to remove heavy metal ions. U.S. Pat. No. 4,080,171, Sano, Mar. 21, 1978 describes a method for the analysis of heavy metal ions in water utilizing chelating compounds on filter paper to trap the heavy metal ions together with an analysis of the filter paper to identify the heavy metal ions. U.S. Pat. No. 4,238,328, Bowes, Dec. 9, 1980 describes the use of some types of chelating materials in water purification. U.S. Pat. No. 4,220,726, Warshawsky, Sept. 2, 1980 utilizes some types of metal extraction chemicals in association with certain resins for the recovery of heavy metal ions from liquid. None of these prior art patents, however, appear to teach the application of chelating agents to the purification of drinking water in the materials, process and device described in the instant application.

Chelating agents have been found useful in a number of other applications where metal ions must be extracted, deactivated or removed from fluids, i.e., the use in blood banking to remove calcium from the plasma to convert it to serum, or as a means of wiping up spills of radioactive metallic ions in laboratories. Chelates have also been employed in medicine, in Vivo, to remove toxic metals from over-exposed individuals as in lead or mercury poisoning. Chelates enhance excretion of the metal from the body by reducing the body burden of the tissues and passing the chelate/metal complex harmlessly through the kidney and bladder, or they decrease gastrointestinal absorption by the body by forming non-absorbable, insoluble chelates.

SUMMARY OF THE INVENTION

It is an object of the present invention to provide a device, material and process for the removal of heavy metal ions from water.

It is another object of the present invention to provide a device, material, and process for the removal of heavy metal ions from drinking water for industrial or municipal water supplies or at the point of use within the home.

It is a further object of the present invention to provide materials which include chelating agents for the purification of drinking water.

It is yet another object of the present invention to provide a process for treating filter bed material with chelating agents such that the treated bed material will remove a broad range of toxic chemicals from drinking water.

It is yet a further object of the present invention to provide a device which utilizes a bed material that is treated with chelating agents to remove a broad range of toxic impurities from drinking water.

The present invention involves a material which utilizes chelating agents to enhance the ability of a bed material treated therewith to remove heavy metal ions from water. The bed material is preferably granulated activated charcoal, such as is currently used in charcoal filters that are attached proximate the point of use in the home. The chelating agent, which may include a combination of several individual chelating compounds, is formulated in a solution that is used to treat the bed materials. The treated bed materials are utilized in a filtration device, whereby the enhanced purification properties of the treated bed material results in a more thoroughly purified drinking water.

It is an advantage of the present invention that it provides a device, material and process for the removal of heavy metal ions from water.

It is another advantage of the present invention that it provides a device, material and process for the removal of heavy metal ions from drinking water for industrial or municipal water supplies or at the point of use within the home.

It is a further advantage of the present invention that it provides materials which include chelating agents for the purification of drinking water.

It is yet another advantage of the present invention to provide a process for treating charcoal with chelating agents such that the treated charcoal will remove a broad range of toxic chemicals from drinking water.

It is yet a further advantage of the present invention that it provides a device which utilizes a bed material that is treated with chelating agents to remove a broad range of toxic impurities from drinking water.

The foregoing and other objects, features, and advantages of the present invention will be apparent from the following detailed description of the preferred embodiments which make reference to the several figures of the drawing.

IN THE DRAWING

DESCRIPTION OF THE PREFERRED EMBODIMENTS

Figure 1:
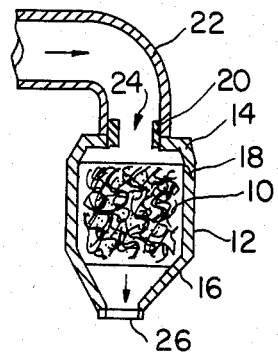
FIG. 1 is a side elevational view which represents a filter cartridge of the present invention within a water tap filter container.

The present invention includes a device, material and method of manufacturing said material for removing toxic agents from water by filtration. The invention incorporates chelating agents within filtering bed material, whereby the chelating agents efficiently complex with toxic metals and bind them to the bed. In the preferred embodiment, the bed material consists of granulated charcoal, which is a well-known material that is utilized in municipal filtration as well as filtration cartridges proximate the outlet tap for home filtration of drinking water.

As indicated hereinabove, a material of the preferred embodiment is a filter bed material into which a chelating chemical has been adsorbed. Chelating chemicals like EDTA (ethylene diamine tetra acetic acid), penicillamine (1 1 Dimethylcystine), BAL (2,3,3, dimercaptopropanol) and DMS (dimercaptosuccinic acid) each have characteristic binding capacities for specific metals. BAL, for example, is particularly effective for binding mercury, arsenic, bismuth and antimony. DMS is particularly good at binding lead and mercury. They also have different degrees of toxicity. Thus, a blend of the appropriate chelates that are sufficiently bound to the bed material will remove the heavy metals of concern in drinking water, yet be non-toxic to the drinker.

| Heavy Metal | EDTA | PENICILLAMINE | DMS | BAL |
|---|---|---|---|---|
| Lead | X | X | X | |
| Mercury | | X | X | X |
| Arsenic | | | | X |
| Zinc | X | | | |
| Copper | | X | | |
| Chromium | X | | | |
| Antimony | | | | X |
| Bismuth | | | | X |

From the above table, it is seen that various combinations of EDTA, Penicillamine, DMS and BAL will sequester most of the toxic metals of interest.

The chelates can be adsorbed directly onto and into the bed material or combined with a polymer which binds onto the bed material.

In the preferred embodiment a polymer is used with chelates in a solution which binds to the bed material. The preferred polymer is a polymer mix of copolymers of acrylics, such as:

3 parts of methyl methacrylate
3 parts of butyl methacrylate
1 part styrene

The above copolymer mix is formulated in a stock which is 50% polymer resin in 50% water. The preferred formulation for the chelating polymer which is used to treat the bed material is a solution of 0.1% polymer stock (1 ml stock per liter of distilled water) plus 0.05% calcium disodium EDTA (0.5 gms per liter) plus 0.05% DMS (0.5 gms per liter) plus 0.05% BAL (0.5 gms per liter). However, the formulation material of the present invention may contain one, two, three, or all four of the EDTA, Penicillamine, BAL, and/or DMS chelates identified hereinabove. Alternatively, chelates can be added to the bed material subsequent to the adsorption of non-chelated polymer.

While the above formulation describes the preferred concentration of chelating compounds, the Applicant's invention is not to be limited thereto. Chelate concentrations in the ranges of 0.01% to 0.75% EDTA, 0.01% to 0.75% DMS, 0.01% to 0.75% Penacillamine and 0.01% to 0.75% BAL are suitable ranges within which the instant invention produces acceptable heavy metal ion removal.

The preferred process for treating a bed material such as granulated activated charcoal with chelating agents utilizes a polymer stock to which the chelating agents have been added prior to adsorption on the bed material. The formulation described above is utilized in the treatment process of the preferred embodiment. This treatment process is as follows:

Using activated charcoal granules of 15–40 mesh obtained from an industry source, such as Supreme Supply Company of Inglewood, CA.

Soak the bed material in the polymer plus chelate formulation solution for 60 minutes with agitation.

Remove the bed material and dry thoroughly.

Soak the dried bed material with 0.1% glatial acetic acid (1.0 ml per liter of distilled water) for 60 minutes with agitation.

Drain the bed material and dry well before use in a cartridge, column or bed.

Upon first use, the bed material should be washed with several flushes of deionized distilled water.

The dry filtration bed material of the present invention is thus a bed material containing the chelating chemicals EDTA, Penicillamine, BAL or DMS or a combination thereof. However, it is to be noted that the chelating chemicals may be adsorbed directly onto the bed material in the concentrations described above without the use of the polymer. Of the two treated bed materials, the material which contains the polymer binding agent is preferred.

The quantity of chelting agent that is bound to the dried filter bed material will vary depending upon such factors as the amount and type of chelating chemical(s) used in the formulation for treating the bed material, the amount and type of polymer used (if any) in the formulation for treating the bed material and the particular bed material that is used. By way of example, when the preferred formulation of polymer plus chelates described hereinabove is utilized to treat granulated activated charcoal, it was found that 1 gram of treated dry granulated activated charcoal would contain approximately 10 to 30 mg of chelating chemicals.

FIG. 1 depicts a side elevational view which represents a cross-sectional view of a water filtration cartridge 10 within a container 12 adapted for attachment to a water faucet 22. The cartridge 10 is held within a thin-walled, substantially cylindrical jacket 12 which has an upper portion 14 and a lower portion 16 that are demountably engaged, such as by utilizing a threaded engagement 18.

The upper portion 14 is threadably engaged 20 to the faucet 22 to form an inlet port 24. It is therefore to be appreciated that water will flow in the direction of the arrows, through the faucet 22, into inlet port 24, through the filtration cartridge 10, and out the outlet port 26 of the filtration device 12. Such filtration devices, as generally described hereinabove, typically utilize granulated charcoal in a replaceable filtration cartridge 10, and are well-known in the prior art. The foregoing generalized description of a filtration cartridge system is provided for background explanatory purposes only, and the present invention is not to be limited to this type of device. The material of the instant invention is generally suitable to remove heavy metals wherever filtration bed materials are utilized.

Figure 2:
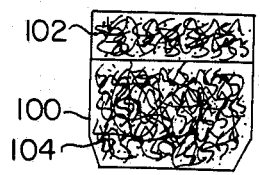
FIG. 2 is a side elevational view which represents an embodiment of a filter cartridge of the present invention.

FIG. 2 depicts a side elevational view of a generalized cartridge 100 of the present invention. The cartridge 100 consists of an upper section 102 and a lower section 104. Upper section 102 includes a filter bed material that has been treated with chelating agents according to the process of the present invention described hereinabove. The lower portion 104 of the filter cartridge 100 contains untreated filter bed material. While the preferred embodiment of FIG. 2 is depicted with the treated bed material 102 in the upper portion of the cartridge 100, it is to be understood that the instant invention also comprises the reversed placement of the treated and untreated bed material, such that the treated bed material portion 102 is the lower portion of the cartridge 100 and the untreated bed material 104 comprises the upper portion of the cartridge 100. The relative proportions of treated and untreated bed material will vary according to the toxicity of the water to be purified as well as the concentrations of chelating agents utilized in the process to manufacture the bed material, as described hereinabove.

Figure 3:
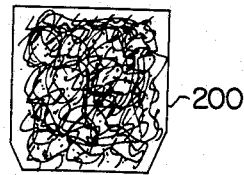
FIG. 3 is a side elevational view of another embodiment of a filter cartridge of the present invention.

FIG. 3 depicts a side elevational view of another preferred embodiment of a filter cartridge 200 of the present invention. The cartridge 200 contains a uniform filtration bed material that has been treated with a chelating agent according to the process of the present invention. The bed material in the cartridge 200 may consist of entirely treated bed material or a uniform mixture of treated and untreated bed material.

In the preferred embodiments of the present invention, as have been described with reference to FIGS. 2 and 3 hereinabove, the preferred bed material may be any solid particulate material, porous or nonporous, to which chelates, or polymers which can bind chelates, can be adsorbed to. Porous materials like activated charcoal present much more surface area and are a preferred filter bed material. Thus, in the preferred embodiments the cartridges of FIGS. 2 and 3 contain treated activated charcoal and untreated activated charcoal, it also being understood that the filtration cartridge 200 may consist of entirely treated activated charcoal.

The following examples indicate the efficacy of the various embodiments described hereinabove.

EXAMPLE I

A prior art cartridge type activated carbon filter, designed for use on kitchen faucets, was disassembled. It contained 59 grams of carbon granules. Two 15 gram portions of the granulated carbon were used for this set of tests. One portion was packed into a ½ inch diameter by 2 foot long tube. This was referred to as filter #1. The other portion was treated with a sodium salt of EDTA, dried, acidified with a minimal amount of hydrochloric acid, rinsed and dried again. This material, when packed as before, was referred to as filter #2. This filter material did not use a polymer for chelate binding.

Three test solutions were filtered through each filter and the filtrates collected for lead concentration measurements by atomic absorption (AA). The first 20 ml of each filtrate was discarded so as to reduce the possibility of cross sample contamination. The results have been presented below.

| Test Sample Type | Concentration (ppb) | |
|---|---|---|
|  | Filter #1 | Filter #2 |
| 0.2 ppm Lead (200 ppb) | 10. | ND* |
| 2.0 ppm Lead (2000 ppb) | 30. | ND |
| 20.0 ppm Lead (20,000 ppb) | 160. | 20. |

*ND means Not Detectable (less than 10. ppb).

The results indicate that the EDTA filter, filter #2, reduced the concentration of lead by a factor of approximately 1000. to 1.

EXAMPLE II

Three filtration columns were prepared for lead removal from water, using the packing materials as follows.

A. 7.0 grams of untreated activated charcoal.

B. 7.0 grams of activated charcoal treated with 0.1% of calcium disodium EDTA solution, dried and then washed with dilute acetic acid (0.01%), then evaporated to dryness.

C. 3.5 grams of untreated activated charcoal plus 3.5 grams of activated charcoal treated with 10 ml. of 0.01% polymer dispersion with 0.1% calcium disodium EDTA in water sample, and then evaporated to dryness and washed with acetic acid solution as in B above and dried.

Each of the three columns were packed in a 30 cm. tube with a diameter of approximately 1.2 cm. A standard 20 ppm lead solution was passed through each column and the output from each column was analyzed for Na, Ca and Pb using an atomic absorption spectrophotometer.

The proper operational conditions were established for each element and the spectrophotometer was standardized with proven standards. The analytical results were as follows.

| Sample | Lead (ppb) | Sodium (ppm) | Calcium (ppm) |
|---|---|---|---|
| A | 50. | 3.6 | 10.5 |
| B | 10. | 16.0 | 58. |
| C | ND* | 5.8 | 18.3 |

*ND means not detectable

After treating the column packings with dilute acetic acid several times (4 to 5 times of the original volume), the amount of both sodium and calcium were reduced to below 1.0 ppm level.

EXAMPLE III

To determine potential toxicity of the EDTA, by leaching of the EDTA from the treated charcoal, the water that was passed through columns B and C in Example II was tested for EDTA.

Those results were as follows:

The EDTA output was measured titrimetrically with a standard magnesium chloride sample using an eriochrome black T indicator.

These results are as follows:

| Column Type | First 20 ml. Effluent | Last 20 ml. Effluent |
|---|---|---|
| Column B | 11.84 ppm EDTA | 1.50 ppm EDTA |
| Column C | 7.40 | 0.70 |

Since the LD/50 for calcium disodium EDTA (the chelate employed) is 10 millimoles per kg, this is 2.9 gm/kg. A 30 kg child (66 pounds) would need to consume and retain 90 gm of EDTA to be poisoned. This would be the equivalent of drinking 30,000 gallons of water at one sitting with 0.7 ppm EDTA present in the water.

EXAMPLE IV

To determine whether the adsorption of EDTA onto the charcoal had any effect upon the ability of the charcoal to filter organic molecules from the water, the filter columns A and B in Example II were tested for chloroform removal from water as follows:

A 20. ppm chloroform solution in DI water was passed through columns A and B, and was tested for its residual concentration by Gas Chromatography (GC), using an electron capture detector (ECD). A GC packed column of 1% SP-1000 on Supelcoport was used as in EPA method 601. Results are as follows.

| Input solution | 20.0 ppm Chloroform |
|---|---|
| Column A output | 2.0 ppm Chloroform |
| Column B output | 1.8 ppm Chloroform |

It has therefore been determined that the adsorption of EDTA onto the charcoal had no deleterious effect upon the ability of the charcoal to filter organic molecules from the water.

While the invention has been particularly shown and described with reference to certain preferred embodiments, it will be understood by those skilled in the art that various alterations and modifications in form and detail may be made therein. Accordingly, it is intended that the following claims cover all such alterations and modifications as may fall within the true spirit and scope of the invention.

We claim:

1. A process for the manufacture of a filter bed material including the following steps: bathing a bed material in a solution of 0.01% to 1.5% polymer solution, said polymer solution containing a chelating agent; agitating said solution; removing said bed material from the solution; drying said bed material; treating said bed material with an acidic solution; removing said bed material from the acidic solution; and drying said bed material.

2. A process as described in claim 1 wherein said filter bed material includes activated charcoal.

3. A process as described in claim 1 wherein said chelating agent is one or more of the chemicals selected from the group consisting of EDTA, Penicillamine, BAL and DMS.

4. A process as described in claim 1 wherein said chelating agent consists of one or more of the water based chelating chemical solutions selected from the group consisting of 0.01% to 0.75% EDTA, 0.01% to 0.75% DMS, 0.01% to 0.75% Penicillamine, and 0.01% to 0.75% BAL.

5. A process as described in claim 4 wherein said chelating chemical solution is further defined as consisting of 0.05% calcium disodium EDTA, 0.05% DMS and 0.05% BAL.

6. A process as described in claim 5 wherein said acidic solution comprises 0.1% glacial acetic acid.

7. A process as described in claim 1 wherein said polymer includes one or more of the polymers selected from the group consisting of methyl methacrylate, butyl methacrylate, and styrene.

8. A process as described in claim 7 wherein said chelating chemical is one or more of the chemicals selected from the group consisting of EDTA, Penacillamine, BAL, and DMS.

9. A process as described in claim 7 wherein said chelating agent consists of one or more of the water based chelating chemical solutions selected from the group consisting of 0.01% to 0.75% EDTA, 0.01% to 0.75% DMS, 0.01% to 0.75% Penicillamine, and 0.01% to 0.75% BAL.

10. A process as described in claim 9 wherein said chelating chemical solution is further defined as consisting of 0.05% calcium disodium EDTA, 0.05% DMS and 0.05% BAL.

* * * * *